(12) United States Patent
Tealdi et al.

(10) Patent No.: US 6,952,574 B2
(45) Date of Patent: Oct. 4, 2005

(54) METHOD AND APPARATUS FOR AUTOMATICALLY TRACKING LOCATION OF A WIRELESS COMMUNICATION DEVICE

(75) Inventors: Daniel A. Tealdi, Hialeah, FL (US); Julio A. Sanchez, Coral Springs, FL (US); Charles B. Swope, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 261 days.

(21) Appl. No.: 10/376,999

(22) Filed: Feb. 28, 2003

(65) Prior Publication Data

US 2004/0185822 A1 Sep. 23, 2004

(51) Int. Cl.$^7$ .......................... H04M 11/04; H04Q 7/20
(52) U.S. Cl. ............................ 455/404.2; 455/414.2; 455/422.1; 455/456.1; 455/457
(58) Field of Search ................ 455/404.1, 428, 455/414.1, 457, 456.1, 414.2, 404.2, 422.1, 456.6

(56) References Cited

U.S. PATENT DOCUMENTS

| | | | | | |
|---|---|---|---|---|---|
| 5,758,288 | A | * | 5/1998 | Dunn et al. | 455/456.5 |
| 5,787,354 | A | * | 7/1998 | Gray et al. | 455/456.1 |
| 5,963,866 | A | * | 10/1999 | Palamara et al. | 455/456.5 |
| 6,060,993 | A | * | 5/2000 | Cohen | 340/691.6 |
| 6,618,594 | B1 | * | 9/2003 | Myers et al. | 455/457 |
| 6,674,368 | B2 | * | 1/2004 | Hawkins et al. | 340/573.4 |
| 6,701,143 | B1 | * | 3/2004 | Dukach et al. | 455/414.2 |
| 6,771,969 | B1 | * | 8/2004 | Chinoy et al. | 455/456.1 |
| 6,885,869 | B2 | * | 4/2005 | Raith | 455/456.6 |

OTHER PUBLICATIONS

Tyco's Scott Health & Safety Unit Introduces Revolutionary Firefighter Tracking System, Tyco Fire & Security, Press Release Thursday Apr. 11, 2002, Yahoo website.

* cited by examiner

Primary Examiner—Binh K. Tieu
(74) Attorney, Agent, or Firm—Barbara R. Doutre

(57) ABSTRACT

A wireless communication system (100) employs a method (700) and apparatus for automatically tracking locations of wireless communication devices (102, 104, 106) in a geographic area, such as an ad hoc area of an emergency scene, that is divided into two or more zones (108, 110, 112). A wireless communication device (102) or a host device (122), determines a location of the wireless device (102). The wireless device's location is then associated with one of the zones (108, 110, 112). An indication (410) of a zone change is presented to a user of the wireless device and/or the host device (102, 122), as applicable, in the event that the wireless device's location reflects a transition of the device from one zone to another. Alternatively, each wireless device (102, 104, 106) might be associated with a corresponding group, such as a fire department, and the zone change indication might include an identifier (412) of the wireless device's group.

25 Claims, 4 Drawing Sheets

METHOD AND APPARATUS FOR AUTOMATICALLY TRACKING LOCATION OF A WIRELESS COMMUNICATION DEVICE

TECHNICAL FIELD

The present invention relates generally to wireless communication systems and, in particular, to tracking devices within such systems.

BACKGROUND

Emergency communication systems are being upgraded on a regular basis to provide improved features, such as faster response times and better accuracy in location determination. While providing substantial improvements over their predecessors, present-day public safety systems still fail to provide an automated "accountability" feature. Accountability refers to the tracking of public safety personnel, such as firefighters and police officers, at the scene of an emergency. The purpose of accountability is to assist on-scene commanders in managing and accounting for their personnel by providing regularly updated locations of these individuals. Since emergency personnel are often moving rapidly, the location data desired for accountability is not necessarily absolute location of personnel, but rather the general area or zone location of such personnel. For example, the on-scene fire commander need not know the step-by-step location of a firefighter, but whether the firefighter is outside the building, on the roof, on the first floor, in the rehabilitation area, and so forth. Hence, accountability provides improved organization for emergency personnel at an emergency scene.

Conventional methods for monitoring accountability are tedious and inaccurate. For example, under one conventional accountability approach, public safety personnel (e.g., firefighters) are issued tags. The tags are typically affixed to pads on each individual's gear or helmet. Upon entering an emergency scene, the tags are collected from each individual within a unit and tracked on a board. If an individual switches locations or gets reassigned to work in another zone of the scene (e.g., with another work group), the reassigned individual's tag is supposed to be moved accordingly on the board. The tag approach requires the individual to radio in his or her location to the commander. In a chaotic emergency environment, however, personnel may switch locations and/or work groups without remembering to report back their change in location. Thus, the tag approach does little to accurately track the location or movement of (i.e., account for) an individual.

For tracking individuals in an ad hoc work area, such as an emergency scene, one current approach employs a computer and a base station transceiver operated by an individual, such as an incident commander, together with portable radios used by the individuals. In this type of tracking system, the work area is divided by the incident commander into multiple zones or sub-areas. Each zone is assigned a channel number. The channels are selected by a rotary channel selector on each portable radio. The individual radio user manually selects the appropriate channel number according to their work group assignment and zone. The base station transceiver receives all the transmitted signals and provides the radio identifications and their channel numbers to the incident commander's computer. An accountability application running on the computer converts the channel numbers to zones and displays the locations of the individuals by radio identification and zone. However, this type of approach is wholly reliant on the individual's reporting of his or her zone location by remembering to change channel number on the radio. In addition, since vision may be impaired during an emergency (e.g., due to smoke) and manipulation of the channel selector may be inhibited (e.g., due to the use of bulky gloves), the individual may inadvertently select the wrong channel/zone, thereby hindering the accountability aspect of the system.

Various location determining technologies, such as the global positioning system and radio frequency triangulation, presently exist to estimate the absolute location of a wireless communication device and, accordingly, the individual presently using the wireless device. While absolute location is desirable in certain emergency situations, such as to locate a wireless device that was used to place an E-911 call, absolute location of emergency personnel at an emergency scene is generally much more information than is necessary to accurately account for the emergency personnel.

Therefore, it would be highly beneficial, particularly (although not solely) in emergency situations, to monitor a zone location of a wireless device in a partitioned geographic area with little or no interaction by the user of the wireless device.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
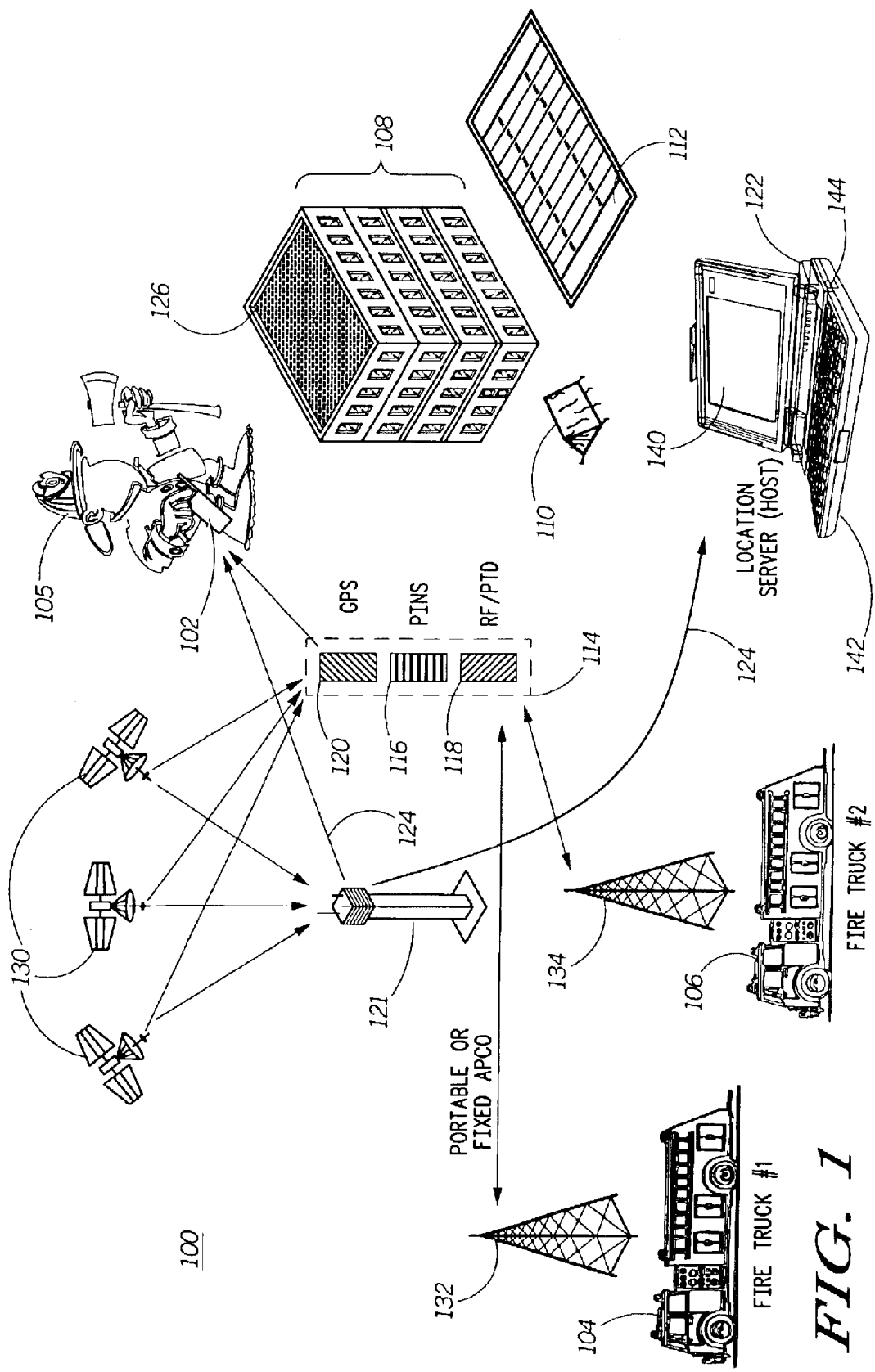
FIG. 1 is a system level diagram of a communications system operating in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention encompasses a method and apparatus for tracking locations of wireless communication devices in a geographic area, such as an ad hoc work area of an emergency scene, that is divided into two or more zones or sub-areas. A host device, such as a location server, determines the location of the wireless communication device. The location of the wireless communication device is then associated with one of the zones. An indication of a zone change is presented to a user of the host device and/or the wireless communication device, as applicable, in the event that the device location reflects a transition of the wireless communication device from one zone to another. In an alternative embodiment, each wireless communication device might be associated with a corresponding group, such as a fire department, and the zone change indication might include an identifier (e.g., an icon) of the wireless communication device's group. By tracking device location in this manner, the present invention provides an automated accountability mechanism to enable zone-level locations of emergency response personnel to be tracked by incident commanders without requiring the personnel to manually update their zone locations, thereby enabling the personnel to better focus on the emergency at-hand while still receiving the safety benefit associated with zone-level location monitoring.

Referring now to FIG. 1, there is shown an example of a system level diagram for a communications system 100 providing wireless communication device tracking in accordance with the present invention. Communication system 100 includes a plurality of wireless communication devices, such as a plurality of radios, here shown as portable radio 102 and mobile radios 104, 106. In accordance with the present invention, wireless communication devices 102, 104 and 106 are or will be dispersed in an ad hoc network divided into a plurality of zones 108, 110, 112. For the purposes of example, communication system 100 is represented here as being implemented into a rescue scene within which the portable radio 102 is used by a user, such as a firefighter 105, while the mobile radios 104, 106 are integrated within fire trucks. The wireless communication device tracking capability of the present invention has applicability to a variety of other ad hoc networks as well.

In accordance with the present invention, system 100 further includes a tracking device 114 having different location technologies. The location technologies of tracking device 114 may include a variety of technologies known in the art, for example, portable inertial navigation system (PINS) 116, triangulation, for example RF ID/personal tracking device (PTD) 118, and global positioning system (GPS) 120 to name a few. A plurality of orbiting satellites 130 interoperate with the different location technologies of tracking device 114, while a wireless site 121, such as an APCO site, provides a wireless link 124 to a host device 122, such as a location server and the portable radio 102. In addition, towers 132, 134 provide support for the triangulation technology. The host device 122 includes a display 140, processor 142, and wireless interface connection 144. A user initiated input at the wireless communication device 102, 104, 106 automatically initiates the automatic tracking mode of the present invention. This input comprises a data message that can take on many forms such as a knob change, key sequence, audio command, or data entry command. Automatic location tracking of the wireless communication devices 102, 104, 106 is enabled by receiving, at the host device 122, the data message initiating automatic location tracking. System 100 then provides location tracking capability of wireless communication devices 102, 104, 106 in the ad hoc network. In operation, host device 122 displays zone information to a resource manager for administering network users, such as an incident commander in public safety.

In the scenario represented by FIG. 1, zone 108 includes a three-dimensional structure 126, such as a building or high-rise. Zones 110, 112 represent geographical areas, such as predetermined fire department coverage areas, here shown as a rehabilitation center 110 and a parking lot 112. In accordance with the present invention, the location of the wireless communication devices 102, 104, 106 is determined using the different tracking technologies of tracking device 114. The location of each wireless communication device 102, 104, 106 is associated with a zone of the plurality of zones 108, 110, 112. In the event that the location of the wireless communication device transitions from a first zone to a second zone an indication of a zone change is presented to the host device 122. Where the wireless communication device being tracked belongs to a group of wireless communication devices then an identifier for the group can be indicated as part of the zone change.

In accordance with the present invention, the location of each wireless communication device 102, 104, 106 is associated with a zone out of the plurality of zones. This association is preferably accomplished by generating three-dimensional, geographic models representing the plurality of zones which will be described with reference to FIG. 2. By determining which three-dimensional, geographic model includes the location there is produced a selected model that can be associated with that location with a zone represented by the selected model.

Figure 2:
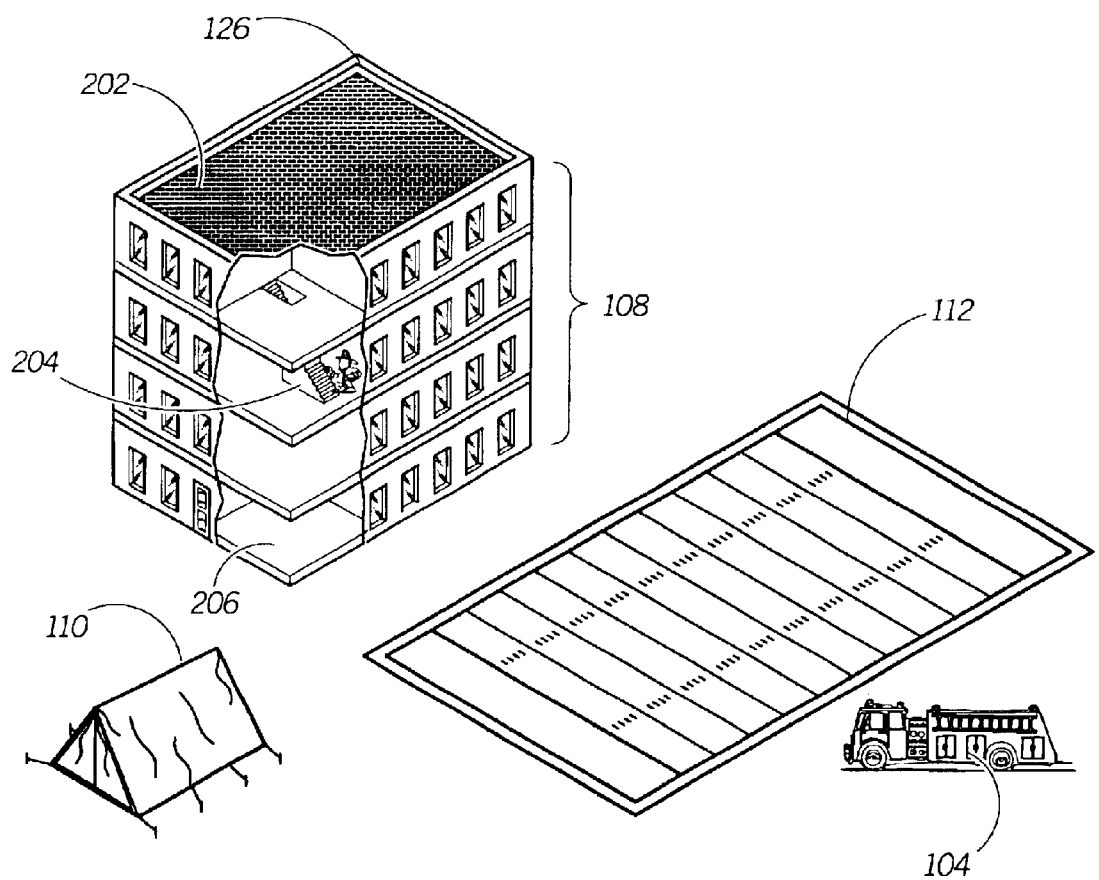
FIG. 2 is an example of a more detailed zone distribution within a portion of the communication system of FIG. 1 in accordance with the present invention.

FIG. 2 provides an example of geographic models created and associated with a zone in accordance with the present invention. In this example, zone 108 again represents building 126, while zone 110 represents the rehabilitation area (such as for oxygen refills), and zone 112 represents the parking lot. Zone 108 includes a plurality of predetermined sub-zones 202, 204, 206. The sub-zones 202, 204, 206 may be 2-d and/or 3-d. If zone 108 is a four-story building, for example, the first sub-zone 202 may be located on the roof and the second sub-zone 204 on inner floors three and four (or regions such as stairs). The third sub-zone 206 could represent the entire bottom floor. The location tracking of the present invention monitors both the portable radio 102, shown within zone 204, and mobile radio 104, shown entering zone 112.

Figure 3:
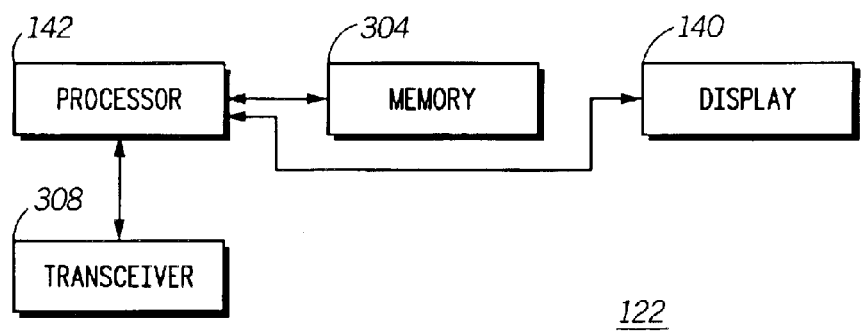
FIG. 3 is an electronic block diagram of the host device of FIG. 1 in accordance with one embodiment of the present invention.

FIG. 3 is a block diagram of the host device 122 of FIG. 1 in accordance with a preferred embodiment of the invention. Host device 122 includes processor 142 and memory 304 operably coupled thereto. The memory 304 stores operating instructions that, in accordance with the present invention, when executed by the processor 142: determine a location of a wireless communication device in a geographic area that is divided into a plurality of zones; associate the location with a zone of the plurality of zones; and determine, based on the location, whether the wireless communication device has transitioned between two zones.

In accordance with the present invention, the display device 140 is responsive to the host processing device 142, for presenting an indication of a zone change in the event that the wireless communication device 102 has transitioned between two zones. A transceiver 308 is operably coupled to the host processing device 142, for receiving messages from the wireless communication devices 102, 104, 106 indicating their zone locations and changes in zone locations. The transceiver 308 can also transmit location information relating to the zone change to its respective wireless communication device if desired.

Figure 4:
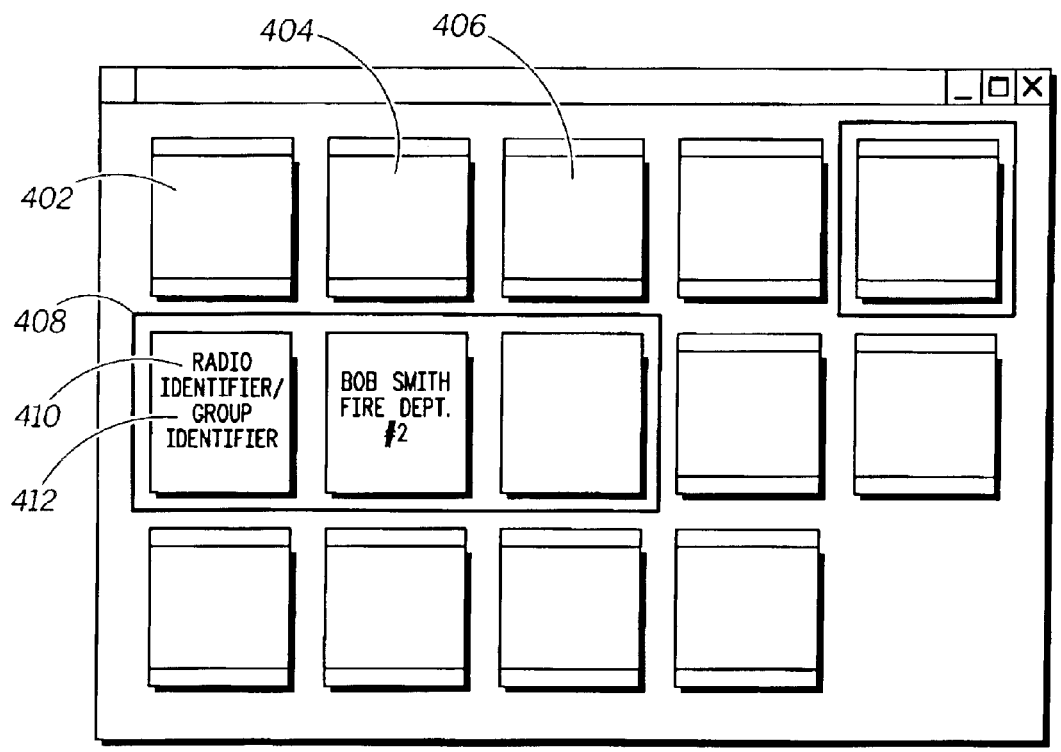
FIG. 4 is an example of a visual display for a host device in accordance with one embodiment of the present invention.

FIG. 4 represents the display 140 of host device 122 in accordance with a preferred embodiment of the invention.

The display 140 provides visual and/or audio feedback to the resource manager pertaining to the zone location of the networked users. Each zone 108, 110, 112 has an assigned display area 402, 404, 406, such as a windowed format. Sub-zones 202, 204, and 206 are represented by a plurality of sub-windows 408. Hence, zone 108 is represented on display 140 by window 402 with sub-zones 202–206 represented by sub-windows 408. As the user transitions from zone to zone the change in zone location information is displayed on the corresponding windows. As the user transitions within a zone, the change in sub-zone location is displayed on the corresponding sub-window through radio identifier 410. Groups of individuals can also be monitored by including a group indicator 412 as part of the data message that gets transferred from the wireless communication device 102 to the host device 122. Individuals from different groups (such as two different fire departments (Fire dept. no. 1 and Fire dept. no. 2) can thus be differentiated amongst the zones. A variety of strings, icons, and aliases can be used as indicators 410, 412. Presenting an indication of a zone change to a user of the host device 122 may include visually displaying an identifier associated with the radio and the group using the wireless communication device. The resource managers can thus manage and instruct the individuals within the groups.

The display device 140 is at least one of a graphic user interface and a speaker. Presenting an indication of a zone change to a user of the host device 122 can thus comprise visually displaying an identity of at least one of the wireless communication devices and a user of the wireless communication device in the windowed format discussed. Presenting an indication of a zone change to a user of a host device can also comprise audibly providing an identity of at least one of the wireless communication devices and a user of the wireless communication device and audibly relating this information to the zone to indicate the zone change. Accordingly, the location tracking capability of the present invention can provide both visual and audible indications of zone changes.

Figure 5:
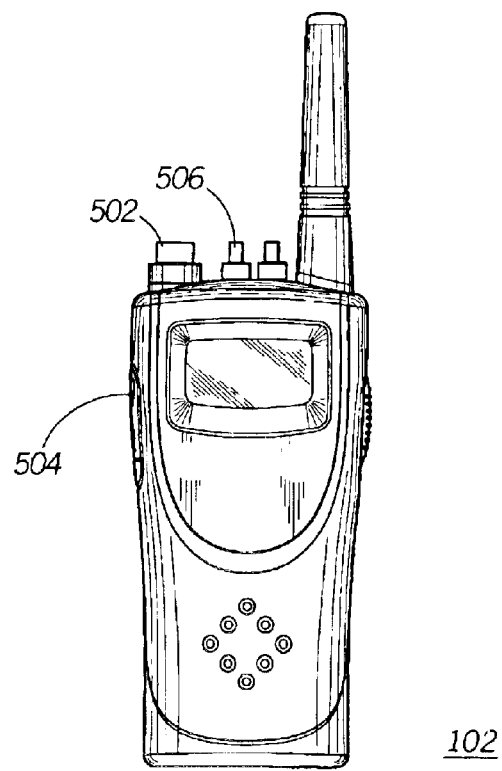
FIG. 5 is an example of a wireless communication device embodied as a portable radio in accordance with a preferred embodiment of the invention.

FIG. 5 shows an example of wireless communication device 102 embodied as a portable radio in accordance with a preferred embodiment of the invention. The radio is preferably a two-way radio that includes a knob or switch 502. Knob 502 when turned to a predetermined position, forces the wireless communication device into an automated tracking mode. Many wireless communication devices can be retrofitted to incorporate the location tracking capability of the present invention by utilizing an existing knob or switch. In accordance with one embodiment of the invention, channel control knob 502 can be rotated by the user to a predetermined position to automatically enable location tracking capability. Other existing switches or knobs can be used as well. For example, a push-to-talk (PTT) button 504 can be used along with a predetermined depress sequence to enable the automatic location tracking (e.g. pressing the PTT quickly three times). Alternatively, an entirely separate new switch 506 can be dedicated to enable and disable the automatic location tracking feature. Voice recognition can also be implemented to train the wireless communication device to respond to a key word or command that automatically enables the location tracking technology. Thus, the user initiated input to automatically enable the location tracking mode can be a switch, a keypress, an audio input, or combinations thereof at the wireless communication device.

Figure 6:
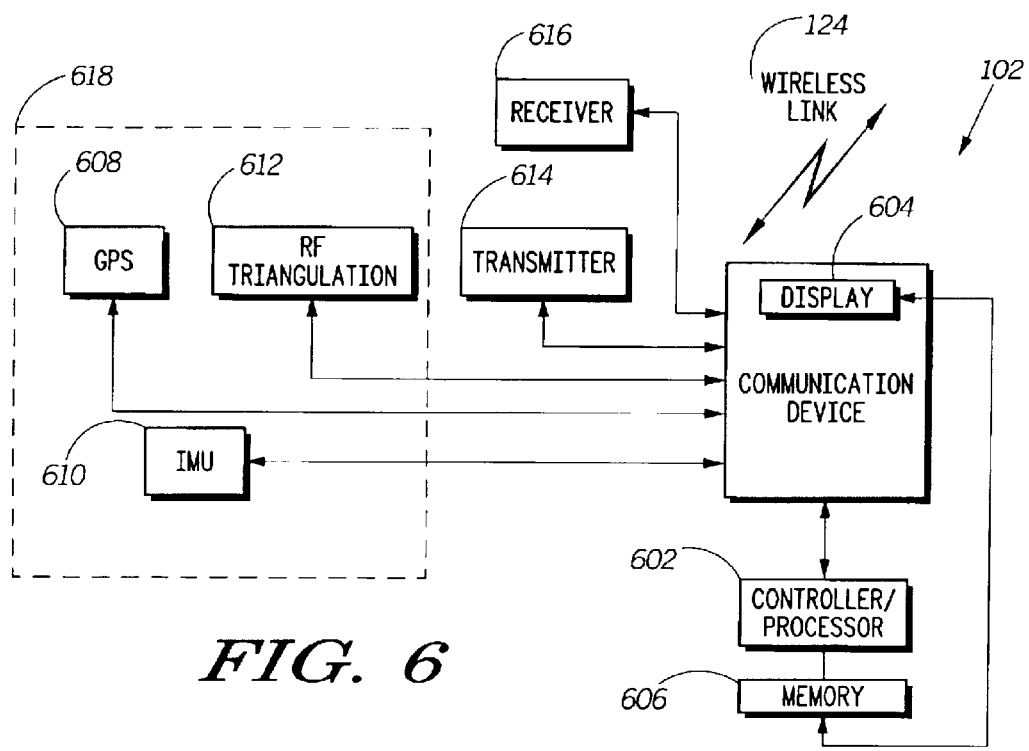
FIG. 6 is an electronic block diagram of the wireless communication device of FIG. 5 in accordance with a preferred embodiment of the invention.

FIG. 6 is a block diagram of the preferred embodiment for each of the wireless communication devices 102, 104, 106 (here referred to by single designator 102). Wireless communication device 102 includes a controller/processor 602, a display device 604, and memory 606 operably coupled to the processor and the display device as well as a transmitter 614 and receiver 616. In accordance with the present invention, wireless communication device 102 further includes location technology compatible with that of the location tracking device 114 of FIG. 1. The location tracking technologies 618 shown here include GPS unit 608, inertial measurement unit (IMU) 610, RF triangulation technology 612 interoperating with the processing capability 602. These location tracking technologies 618 may be embodied inside the wireless communication device 102 or located outside the wireless communication device as an accessory.

In operation, the global positioning system (GPS) 608 is operably coupled to the controller/processor 602, for receiving GPS signals from the plurality of orbiting satellites 130 (from FIG. 1). Processor operating instructions further determine the location of the wireless communication device 102 based at least in part on the GPS signals.

The inertial measurement unit 610 is operably coupled to the controller/processor 602 for determining relative three-dimensional movement of the wireless communication device 102. The processor operating instructions further cause the processor 602 to determine the location of the wireless communication device 102 based at least in part on the relative three-dimensional movement measured by the IMU.

The RF triangulation technology 612 is operably coupled to the processor 602 for determining absolute three-dimensional movement of the wireless communication device 102. Again, the operating instructions further cause the processor 602 to determine the location of the wireless communication device 102 based at least in part on the accuracy of the processed signal.

The IMU 610 may include tri-axial accelerometer, tri-axial gyroscope, and temperature sensor. The controller/processor 602 performs a method described in FIG. 7 to automatically determine zone changes based on the information acquired through the position technologies. The display 604 preferably displays location tracking information to the user either visually or audibly. Wireless communication device 102 transfers the location tracking information to and from location tracking device 114 (of FIG. 1) which in turn transfers the information to host device 122 via wireless link 124.

To summarize the embodiment of FIG. 6, in operation, memory 606 stores operating instructions that, when executed by the controller/processor 602, cause the processor to, in accordance with the present invention: determine a location of the wireless communication device in a geographic area that is divided into a plurality of zones; associate the location with a zone of the plurality of zones; and present on the display device 604 an indication of a zone change in the event that the location of the wireless communication device has transitioned from a first zone to a second zone. The display device 604 can be either an audible and/or visual device, such as a speaker and/or a graphic user interface. The indication of a zone change is also relayed back to the host device 122 for simultaneous viewing on display 140. Thus, both the wireless communication device user and the user of the host device 122 can monitor zone transitions simultaneously.

Figure 7:
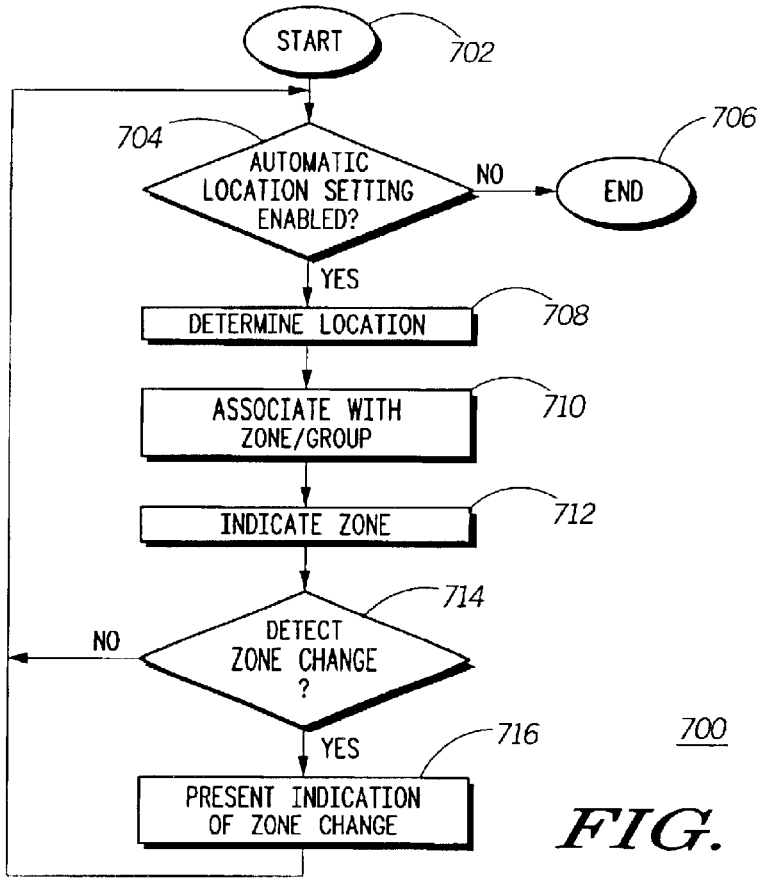
FIG. 7 is a method for automatically tracking the location of a wireless communication device in a geographic area that is divided into a plurality of zones in accordance with the present invention.

Referring now to FIG. 7, there is shown a flowchart 700 of a method for automatically tracking the location of a wireless communication device in a geographic area that is divided into a plurality of zones in accordance with the present invention. The flowchart 700 starts at 702 by detecting whether the wireless communication device has been placed in an automatic setting at 704. If not on an automatic setting at step 704, then the automatic tracking is not enabled (ends) 706. If the wireless communication device has been placed in automatic setting at 704, then tracking continues by determining a location of the wireless communication device at 708. Determining the location can be performed as described previously using a variety of location tracking technologies, preferably using at least one of global positioning system (GPS), triangulation, and inertial guidance. In accordance with the present invention, method 700 proceeds with associating the location, determined at 708, with a zone of the plurality of zones at 710. The zone is indicated at step 712 and monitoring for zone change begins at step 714. If no zone change occurs at 714 then the method 700 returns to detecting an automatic setting at 704. If a zone change was determined at step 714, then presenting, based on the location, an indication of a zone change in the event that the wireless communication device has transitioned from a first zone to a second zone occurs at 716. The indication of zone change can be presented to the user of the host device and/or the user of the wireless communication device. Method 700 can further incorporate group identification by associating the wireless communication device with a group at step 710 and including an identifier for the group within the presented indication at 716.

In reviewing some of the steps used in location tracking method 700, a variety of alternative embodiments can be used to detect whether the wireless communication device has been placed in an automatic location tracking setting at 704. For example, detecting whether the wireless communication device has been placed in an automatic location tracking setting at 704 can be accomplished by receiving an input from a user of the wireless communication device to initiate automatic location tracking. The step of receiving an input can be accomplished at the wireless communication device or the host device. Receiving the input can be accomplished, at the host device, via a data message requesting initiation of automatic location tracking. Receiving the input can be accomplished at the wireless communication device, via a change in position of at least one of a knob, a switch, a keypress, and an audible command as was previously described with reference to FIG. 5.

Associating the location with a zone of the plurality of zones at 710 is preferably accomplished by generating three-dimensional, geographic models respectively representing the plurality of zones; determining which three-dimensional, geographic model includes the location to produce a selected model; and associating the location with a zone represented by the selected model.

Presenting the indication of the zone change to a user of the host device or a user of the wireless communication device at step 716 is preferably accomplished by at least one of annunciating an identifier of the zone to the user and visually displaying the identifier of the zone to the user.

The zone change can be presented to the user of a host device by visually displaying an identity of at least one of the wireless communication devices and a user of the wireless communication device in a windowed format, as previously described in conjunction with FIG. 3. The method may further comprise visually displaying an identifier associated with a group containing the wireless communication device. From the audible standpoint, the step of presenting an indication of a zone change to a user of a host device can comprise audibly providing an identity of at least one of the wireless communication devices and a user of the wireless communication device.

The wireless communication device location tracking capability provided by the present invention has applicability to a variety of ad hoc networks including emergency scene, resource management, asset tracking, and any other ad hoc network in which general location of individuals is desirable. A resource manager will benefit from the ability to locate and organize individuals within and variety of zones and groups thus providing for effective management and dispersement of personnel resources.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for automatically tracking location of a wireless communication device in an ad hoc area that is divided into a plurality of zones, the method comprising:
   determining a location of the wireless communication device;
   associating the location with a zone of the plurality of zones; and
   presenting, based on the location, an indication of a zone change in the event that the wireless communication device has transitioned from a first zone to a second zone.

2. The method of claim 1, further comprising:
   transmitting the indication of the zone change to the wireless communication device.

3. The method of claim 1, further comprising:
   transmitting the indication of the zone change to a host device,
   wherein presenting the indication of a zone change comprises presenting the indication of the zone change to a user of the host device.

4. The method of claim 1, wherein presenting the indication of a zone change comprises presenting the indication of the zone change to a user of the wireless communication device.

5. The method of claim 4, wherein presenting the indication of the zone change to a user or the wireless communication device comprises at least one of annunciating an identifier of the zone to the user and visually displaying the identifier of the zone to the user.

6. The method of claim 1, wherein presenting an indication of a zone change comprises presenting the indication of the zone change to a user of a host device.

7. The method of claim 6, wherein presenting an indication of a zone change to a user of a host device comprises visually displaying an identity of at least one of the wireless communication devices and a user of the wireless communication device in a windowed format.

8. The method of claim 7, further comprising visually displaying an identifier associated with a group containing the wireless communication device.

9. The method of claim 6, wherein presenting an indication of a zone change to a user of a host device comprises audibly providing an identity of at least one of the wireless communication devices and a user of the wireless communication device and audibly relating at least one of the wireless communication devices and the user of the wireless communication device to the zone to indicate the zone change.

10. The method of claim 1, wherein determining a location comprises determining a location based on at least one of global positioning system (GPS), triangulation, and inertial guidance.

11. The method of claim 1, further comprising:
prior to determining a location of the wireless communication device, receiving an input from a user of the wireless communication device to initiate automatic location tracking of the wireless communication device.

12. The method of claim 11, wherein receiving an input from the user of the wireless communication device to enable automatic location tracking comprises receiving, at a host device, a data message requesting initiation of automatic location tracking.

13. The method of claim 11, wherein receiving an input from the user of the wireless communication device to initiate automatic location tracking comprises receiving, at the wireless communication device, a change in position of at least one of a knob, a switch, a keypress, and an audible command.

14. The method of claim 1, wherein associating the location with a zone of the plurality of zones comprises:
generating three-dimensional, geographic models respectively representing the plurality of zones;
determining which three-dimensional, geographic model includes the location to produce a selected model; and
associating the location with the zone represented by the selected model.

15. A method for automatically tracking locations of groups of wireless communication devices in an adhoc area that is divided into a plurality of zones, the method comprising:
determining a location of a wireless communication device;
associating the location with a zone of the plurality of zones;
associating the wireless communication device with a group; and
presenting an indication of a zone change in the event that the location of the wireless communication device has transitioned from a first zone to a second zone, wherein the indication includes an identifier for the group.

16. A wireless communication device comprising:
a processor;
a display device; and
memory operably coupled to the processor and the display device, the memory storing operating instructions that, when executed by the processor, cause the processor to:
determine a location of the wireless communication device in an ad hoc area that is divided into a plurality of zones;
associate the location with a zone of the plurality of zones; and
present on the display device an indication of a zone change in the event that the location of the wireless communication device has transitioned from a first zone to a second zone.

17. The wireless communication device of claim 16, wherein the display device is at least one of a speaker and a graphic user interface.

18. The wireless communication device of claim 16, further comprising:
a global positioning system (GPS) receiver, operably coupled to the processor, for receiving GPS signals from a plurality of orbiting satellites; and
wherein the operating instructions further cause the processor to determine the location of the wireless communication device based at least in part on the GPS signals.

19. The wireless communication device of claim 18, further comprising:
an inertial guidance unit, operably coupled to the processor, for determining relative three-dimensional movement of the wireless communication device; and
wherein the operating instructions further cause the processor to determine the location of the wireless communication device based at least in part on the relative three-dimensional movement of the wireless communication device.

20. The wireless communication device of claim 19, further comprising:
an RF triangulation technology, operably coupled to the processor, for determining absolute three-dimensional movement of the wireless communication device; and
wherein the operating instructions further cause the processor to determine the location of the wireless communication device based at least in part on the absolute three-dimensional movement of the wireless communication device.

21. A wireless communication device tracking system comprising:
a host processing device including a processor and memory operably coupled to the processor, the memory storing operating instructions that, when executed by the processor, cause the processor to:
determine a location of a wireless communication device in an ad hoc area that is divided into a plurality of zones;
associate the location with a zone of the plurality of zones; and
determine, based on the location, whether the wireless communication device has transitioned between two zones;
a display device, responsive to the host processing device, for presenting an indication of a zone change in the event that the wireless communication device has transitioned between two zones; and
a transceiver, operably coupled to the host processing device, for transmitting information relating to the zone change to the wireless communication device.

22. The wireless communication device tracking system of claim 21, wherein the wireless communication device being tracked belongs to a group of wireless communication devices and wherein the indication of the zone change includes an identifier for the group.

23. Tho wireless communication device tracking system of claim 21, wherein the information relating to the zone change includes an identifier of the zone associated with the location of the wireless communication device.

24. The wireless communication device tracking system of claim 21, wherein the display device is at least one of a speaker and a graphic user interface.

25. The wireless communication device tracking system of claim 21, wherein the transceiver is further operable to receive a message from the wireless communication device, the message indicating the location of the wireless communication device.

* * * * *